United States Patent [19]

Brunetti

[11] 3,993,622

[45] Nov. 23, 1976

[54] BIS-SALICYLOYL-HYDRAZINE AS STABILIZER FOR POLYMERS

[75] Inventor: Heimo Brunetti, Reinach, Switzerland

[73] Assignee: Ciba-Geigy Corporation, Ardsley, N.Y.

[22] Filed: Feb. 11, 1975

[21] Appl. No.: 549,132

Related U.S. Application Data

[60] Continuation of Ser. No. 446,991, Feb. 28, 1974, abandoned, which is a division of Ser. No. 186,393, Oct. 4, 1971, Pat. No. 3,849,492.

[30] Foreign Application Priority Data

Oct. 8, 1970 Switzerland............. 14967/70
Aug. 6, 1971 Switzerland............. 11997/71

[52] U.S. Cl. ........................ 260/45.9 NC
[51] Int. Cl.$^2$............................ C08K 5/20
[58] Field of Search .............. 260/45.95 NC

[56] References Cited

UNITED STATES PATENTS

| | | | |
|---|---|---|---|
| 2,808,416 | 10/1957 | Bell et al. ................ | 260/45.9 NC |
| 3,110,696 | 11/1963 | Dexter..................... | 260/45.9 NC |
| 3,884,874 | 5/1975 | Rosenberger et al. ...... | 260/45.9 NC |
| 3,887,518 | 6/1975 | Rosenberger et al. ...... | 260/45.9 NC |

FOREIGN PATENTS OR APPLICATIONS 1,093,383   11/1967   United Kingdom ......... 260/45.9 NC

*Primary Examiner*—V.P. Hoke

[57] ABSTRACT

N,N'-bis-salicyloyl-hydrazine is a suitable stabilizer for polymers against deterioration induced by transition metals.

7 Claims, No Drawings

BIS-SALICYLOYL-HYDRAZINE AS STABILIZER FOR POLYMERS

This is a continuation of application Ser. No. 446,991 filed on Feb. 28, 1974 now abandoned which is a divisional of Ser. No. 186,393, filed Oct. 4, 1971 now U.S. Pat. No. 3,849,492.

The subject of the present invention is N,N bis-salicyloyl-hydrazine and its use for stabilising polymers.

Polymers, such as, polyolefines, especially polypropylene, because of their physical and electrical properties are very suitable for use as an insulating material in the electrical industry, especially for the sheathing and coating of copper wires, copper cables and other electrically conducting materials made of copper.

Unfortunately, however, the said good properties of the polyolefines deteriorate as a result of the fact that in contact with transition metals, especially with copper and its compounds, they undergo an oxidative degradation catalysed by these metals. Copper additions of less than 1%, for example, lead to the oxidation stability of polypropylene being reduced by a factor of ~100.

Various different derivatives of salicyloyl-hydrazine have already become known for the stabilisation of polyolefines against the harmful effect of transition metals. Thus, U.S. Pat. No. 3,110,696 recommends employing N-salicyloyl-N'-salicylidene-hydrazines for this purpose. Whilst these compounds prove active as metal deactivators they have the disadvantage of causing objectionable yellow discolouration of the polymer. British patent specification No. 1,093,383 describes salicylic acid hydrazide and its alkylated, cycloalkylated and arylated derivatives, which, whilst they are in themselves colourless substances, as regards their metal-deactivating action in no way approach the abovementioned salicylidene derivatives of salicylic acid hydrazide. The same is true of the acylation products of salicylic acid hydrazide described in Japanese Pat. No. 43-18,607. The two last-mentioned types of compound furthermore suffer from the disadvantage that they objectionably discolour the polyolefine either already on incorporation or under thermo-oxidative ageing conditions.

Surprisingly, it has now been found that N,N'-bis-salicyloyl-hydrazine is very suitable for the stabilisation of polymers, such as homopolymeric or copolymeric polyolefines against thermo-oxidative degradation, especially in the presence of transition metals, and this compound has at the same time good colour properties.

N,N'-bis-salicyloyl-hydrazine is a known compound.

N,N'-bis-salicyloyl-hydrazine is not only an excellent stabiliser, the action of which markedly surpasses that of the classes of compounds described above, but additionally has the advantage of being colourless. This allows its incorporation into polyolefines without objectionably discolouring the latter. Furthermore, all the previously known compounds mentioned show the property of discolouring polyolefines under ageing conditions, whilst the compound usable according to the invention causes practically no discolourations under these conditions, which represents a great technical advantage for long-term stabilisation.

As compared to previously known compounds, N,N'-bis-salicyloyl-hydrazine also shows the advantage of greater heat stability, that is to say it can be incorporated into polymers at high temperatures without causing objectionable bubble formation through thermal decomposition.

N,N'-bis-salicyloyl-hydrazine provides protection against degradation for polyolefines, preferably α-olefine polymers, such as polypropylene, optionally crosslinked polyethylene, polyisobutylene, polymethylbutene-1, polymethylpentene-1, polybutene-1, polyisoprene, polybutadiene and polystyrene; copolymers of the monomers on which the homopolymers mentioned are based, such as ethylene-propylene copolymers, propylenebutene-1 copolymers, propylene-isobutylene copolymers and styrene-butadiene copolymers, and terpolymers of ethylene and propylene with a diene, such as, for example, hexadiene, dicyclopentadiene or ethylidenenorbonene; mixtures of the abovementioned homopolymers such as, for example, mixtures of polypropylene and polyethylene, polypropylene and polybutene-1, and polypropylene and polyisobutylene; other elastomers such as natural caoutchouc; copolymers, which are derived from acrylonitril, styrene and butadiene or acrylic esters. Polypropylene as well as its mixtures and the copolymers which contain propylene units are preferred.

N,N'-bis-salicyloyl-hydrazine is incorporated into the substrates in a concentration of 0.01 to 5% by weight calculated relative to the material to be stabilised.

Preferably, 0.05 to 1.5, and particularly preferably 0.1 to 0.8, % by weight of the compound, calculated relative to the material to be stabilised, is incorporated into the material.

The incorporation can be effected after the polymerisation, for example by mixing N,N'-bis-salicyloyl-hydrazine, and optionally further additives, into the melt in accordance with the methods customary in the art, before or during shaping, or by applying the dissolved or dispersed compounds to the polymer, if necessary with subsequent evaporation of the solvent.

In the case of crosslinked polyethylene, N,N'-bis-salicyloyl-hydrazine is added before the crosslinking.

the polyolefines stabilised by addition of the compound according to the invention are, in particular, suitable for use as a coating material for copper wires and cables, but also for other types of metal coating and for the manufacture of shaped articles, such as films, filaments, sheets, pipes, injection-moulded articles and the like. They can also be used mixed with copper or pigments containing copper.

As further additives together with which the stabiliser usable according to the invention can be employed, there should be mentioned:

1. Antioxidants of the aminoaryl and hydroxyaryl series. In the case of the latter, the sterically hindered phenol compounds should be mentioned, for example: 2,2'-thiobis-(4-methyl-6-tert.-butylphenol), 4,4'-thio-bis-(3-methyl-6-tert.-butylphenol), 2,2'-methylene-bis-(4-methyl-6-tert.-butylphenol), 2,2'-methylene-bis-(4-ethyl-6-tert.-butylphenol), 4,4'-methylene-bis-(2-methyl-6-tert.-butylphenol), 4,4'-butylidene-bis-(3-methyl-6-tert.-butylphenol), 2,2'-methylene-bis-[4-methyl-6-(α-methylcyclohexyl)-phenol], 2,6-di-(2-hydroxy-3-tert.-butyl-5-methylbenzyl)-4-methylphenol, 2,6-di-tert.-butyl-4-methylphenol, 1,1,3-tris-(2-methyl-4-hydroxy-5-tert.-butyl-phenyl)-butane and 1,3,5-trimethyl-2,4,6-tri-(3,5-di-tert.-butyl-4-hydroxybenzyl)-benzene, esters of β-4-hydroxy-3,5-di-tert.-butylphenyl-propionic acid with monohydric or polyhydric alcohols, such as methanol, ethanol, octadecanol, hexanediol, nonanediol, thiodiethylene glycol, trimethylolethane or pentaerythritol, 2,4-bis-octylmercapto-6-(4-hydroxy-3,5-di-tert.-butylanilino)-s-triazine, 2,4-bis-(4-hydroxy-3,5-di-tert.-butylphenoxy)-6-octylmercapto-s-triazine, 1,1-bis-(4-hydroxy-2-methyl-5-tert.-butyl-phenyl)-3-dodecylmercapto-butane, 4-hydroxy-3,5-di-tert.-butylbenzyl-phosphonic acid esters, such as the dimethyl, diethyl or dioctadecyl ester, (3-methyl-4-hydroxy-5-tert.-butylbenzyl)-malonic acid dioctadecyl ester, s-(3,5-dimethyl-4-hydroxyphenyl)-thioglycollic acid octadecyl ester, esters of bis-(3,5-di-tert.-butyl-4-hydroxy-benzyl)-malonic acid, such as the didodecyl ester, the dioctadecyl ester and the 2-dodecylmercaptoethyl ester.

Amongst the amino aryl derivatives, aniline and naphthylamine derivatives, as well as their heterocyclic derivatives should be mentioned, for example phenyl-1-naphthylamine, phenyl-2-naphthylamine, N,N'-diphenyl-p-phenylenediamine, N,N'-di-2-naphthyl-p-phenylenediamine, N,N'-di-sec.-butyl-p-phenylenediamine, 6-ethoxy-2,2,4-trimethyl-1,2-dihydroquinoline, 6-dodecyl-2,2,4-trimethyl-1,2-dihydroquinoline, monooctyliminodibenzyl and dioctyliminodibenzyl, and polymerised 2,2,4-trimethyl-1,2-dihydroquinoline, though in the case of the combined use of the compounds of the formula I with the abovementioned amine compounds the stabilised polymer no longer has good colour properties, because of the tendency of the amine compounds to discolour.

2. UV-absorbers and light protection agents, such as:
a. 2-(2'-Hydroxyphenyl)-benztriazoles, for example the 5'-methyl, 3',5'-di-tert.-butyl, 5'-tert.-butyl, 5-chloro-3', 5'-di-tert.-butyl, 5-chloro-3'-tert.-butyl-5'-methyl, 3',5'-di-tert.-amyl, 3'-methyl-5'-β-carbomethoxyethyl, and 5-chloro-3',5'-di-tert.-amyl derivative.

b. 2,4-Bis-(2'-hydroxyphenyl)-6-alkyl-s-triazines, for example the 6-ethyl or 6-undecyl derivative.

c. 2-Hydroxy-benzophenones, for example the 4-hydroxy-, 4-methoxy, 4-octoxy, 4-decyloxy, 4-dodecyloxy, 4,2',4'-trihydroxy or 2'-hydroxy-4,4'-dimethoxy derivative.

d. 1,3-Bis-(2'-hydroxy-benzoyl)-benzenes, for example 1,3-bis-(2'-hydroxy-4'-hexyloxy-benzoyl)-benzene, 1,3-bis-(2'-hydroxy-4'-octoxy-benzoyl)-benzene and 1,3-bis-(2'-hydroxy-4'-dodecyloxy-benzoyl)-benzene.

e. Aryl esters of optionally substituted benzoic acids, for example phenylsalicylate, octylphenylsalicylate, benzoylresorcinol, dibenzoylresorcinol, 3,5-di-tert.-butyl-4-hydroxybenzoic acid 2,4-di-tert.-butylphenyl ester or -octadecyl ester.

f. Acrylates, for example α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, and N-(β-carbomethoxyvinyl)-2-methylindoline.

g. Nickel compounds, for example nickel complexes of 2,2'-thiobis-(4-tert.-octylphenol), such as the 1:1 and 1:2 complex, optionally with other ligands such as n-butylamine, nickel complexes of bis-(4-tert.-octyl-phenyl)-sulphone, such as the 2:1 complex, optionally with other ligands such as 2-ethylcaproic acid, nickel dibutyldithiocarbamate, nickel salts of 4-hydroxy-3,5-di-tert.-butylbenzyl-phosphonic acid monoalkyl esters, such as the methyl, ethyl or butyl ester, and the nickel complex of 2-hydroxy-4-methyl-phenyl-undecylketonoxime.

h. Oxalic acid diamides, for example 4,4'-di-octyloxy-anilide, 2,2'-di-octyloxy-5,5'-di-tert.-butyl-oxanilide, and 2,2'-di-dodecyloxy-5,5'-di-tert.-butyl-oxanilide.

3. Phosphites, such as triphenylphosphite, diphenylalkylphosphites, phenyldialkylphosphites, trinonylphenylphosphite, trilaurylphosphite, trioctadecylphosphite, 3,9-di-isodecyloxy-2,4,8,10-tetraoxa-3,9-diphosphaspiro-(5.5)-undecane and tri-(4-hydroxy-3,5-di-tert.-butylphenyl)-phosphite.

4. Nucleating agents, such as 4-tert.-butylbenzoic acid, adipic acid and diphenylacetic acid.

5. Peroxide-destroying compounds, such as esters of β-thiodipropionic acid, for example the lauryl, stearyl, myristyl or tridecyl ester. Salts of 2-mercaptobenzimidazole, for example the zinc salt, and diphenylthiourea.

6. other additives, such as plasticisers, antistatic agents, flameproofing agents, pigments, carbon black, asbestos, glass fibers, kaolin, talc and blowing agents.

When using N,N'-bis-salicyloyl-hydrazine in combination with phenolic antioxidants, particularly good stabilising effects are achieved if peroxide-destroying compounds, such as higher alkyl esters of thiopropionic acid are employed simultaneously, since these peroxide-destroying compounds not only show synergism with the phenolic antioxidants, as is known, but also show synergism with the N,N'-bis-salicyloyl-hydrazine.

The invention is explained in more detail in the examples which follow.

EXAMPLE 1

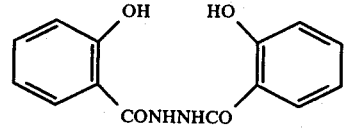

30.4 g of salicylic acid hydrazide are dissolved in 500 ml of dimethylacetamide and 34.8 g of salicylic acid chloride are added dropwise over the course of 70 minutes at 25° – 40° C. The yellow solution is stirred for 3 hours at room temperature and is then poured into 1 liter of water, whereupon white, fine crystals precipitate. The substance is filtered off, washed with water and dried in vacuo at 60° C. The product is purified by recrystallisation from ethylene glycol monomethyl ether. The N,N'-bis-salicyloyl-hydrazine thus obtained (stabiliser No. 1), melts at 303° C.

The previously known metal deactivators for polyolefines listed in Table I below were conjointly tested as comparison compounds in the test examples which follow:

Table 2

| Stabiliser No. | Chemical Designation |
|---|---|
| 22 | Salicylic acid hydrazide |
| 23 | 5-tert.-Butyl-salicylic acid hydrazide |
| 24 | 5-tert.-Octyl-salicylic acid hydrazide |
| 25 | N-Acetyl-N'-salicyloyl-hydrazine |
| 26 | N-Salicyloyl-N'-salicylidene-hydrazine |

EXAMPLE 9 a. Production of the Test Specimens 100 parts of polypropylene (melt index 3.2 g/10 minutes, 230° C/2160 g) are thoroughly mixed for 10 minutes, in a shaking apparatus, with 0.1 part of β-(3,5-di-t.butyl-4-hydroxy-phenyl)-propionic acid octadecyl ester, 0.3 part of dilaurylthiodipropionate and 0.5 part of a stabiliser listed in Table II below.

The mixture obtained is kneaded for 10 minutes in a Brabender plastograph at 200° C, 1.0% by weight of powdered copper (manufactured electrolytically, Merck) is then added, and the whole is thoroughly mixed for a further 2 minutes at the same temperature. The composition thus obtained is subsequently pressed in a platen press at 260° C platen temperature to give 1 mm thick sheets from which strips 1 cm wide and 17 cm long are punched.

The heat-stabilised test specimens without added copper, or with added copper but without metal deactivator, required for comparison purposes, are prepared analogously.

b. Test

The effectiveness of the metal deactivators added to the test strips containing copper is tested by heat ageing in a circulating air oven at 149° C and is compared with test strips not containing copper. For this purpose, 3 test strips of each formulation are employed. The incipient, easily visible decomposition of the test strip is defined as the end point.

Table 3

| Stabiliser No. | Days up to Decomposition | |
|---|---|---|
| | without Cu | with Cu |
| without stabiliser | 18 – 27 | << 1 |
| 1 | 17 | 17 |
| Comparison Products | | |
| 22 | 27 | 7 |
| 23 | 23 | 4 |
| 24 | 30 | 5 |
| 25 | 20 | 4 |
| 26 | 19 | 16 |

EXAMPLE 3 a. Manufacture of the Test Specimens 100 parts of polypropylene (melt index 3.2 g/10 minutes, 230° C/2160 g) are thoroughly mixed for 10 minutes, in a shaking apparatus, with 0.1 part of $\beta$-(3,5-di-tert.-butyl-4-hydroxy-phenyl)-propionic acid octadecyl ester, 0.3 part of dilauryl thiodipropionate and 0.5 part of a stabiliser listed in Table III below.

The mixture obtained is kneaded in a Brabender plastograph at 200° C for 10 minutes, 1.0% by weight of powdered copper (manufactured electrolytically, Merck) is then added and the whole is thoroughly mixed at the same temperature for a further 2 minutes. The composition thus obtained is subsequently pressed in a platen press at 260° C platen temperature to give 1 mm thick sheets, from which strips 1 cm wide and 17 cm long are punched by means of a punch tool.

The heat-stabilised test specimens without added copper or with added copper but without metal deactivator, required for comparison purposes, are manufactured analogously.

b. Test

The effectiveness of the metal deactivators added to the test strips containing copper is tested by heat ageing in a circulating air oven at 135° C and is compared with test strips not containing copper. For this purpose, 3 test strips of each formulation are employed. The incipient, easily visible decomposition of the test strip is defined as the end point.

The preservation factor indicated in the 4th column of Table 4 is characterised as follows:

$$\text{Preservation factor} = \frac{\text{days up to decomposition with copper}}{\text{days up to decomposition without copper}} \times 100$$

Table 4

| Stabiliser No. | Days up to Decomposition | | Preservation Factor |
|---|---|---|---|
| | without Cu | with Cu | |
| without stabiliser | 70 – 95 | < 1 | < 1 |
| 1 | 82 | 82 | 100 |
| Comparison Products | | | |
| 22 | 87 | 24 | 28 |
| 23 | 117 | 53 | 45 |
| 24 | 115 | 46 | 40 |
| 25 | 90 | 27 | 30 |
| 26 | 86 | 72 | 84 |

EXAMPLE 4

The test specimens described in Examples 2 and 3, without added copper, were additionally tested for their colour stability, and in particular
 a. after incorporation (Table IV, column 2)
 b. after heat ageing at 149° C (Table IV, column 3)
 c. after 1 week's treatment with boiling water (Table IV, column 4).

For Table IV, an empirical colour scale was used, in which 5 denotes absence of colour, 4 denotes a just perceptible, slight discolouration and 3, 2, 1 and < 1 denote succesively more intense discolouration.

Table 5

| Stabiliser No. | Colour Assessment according to Scale 1 to 5 | | |
|---|---|---|---|
| | after incorporation | after heat ageing | boiling water, 1 week |
| without stabiliser | 5 | 4 | 4 |
| 1 | 4 | 2 – 3 | 3 – 4 |
| Comparison Products | | | |
| 22 | 1 | 1 – 2 | < 1 |
| 23 | 1 – 2 | 1 | 1 |
| 24 | 1 – 2 | 1 | 1 |
| 25 | 1 | 1 – 2 | < 1 |
| 26 | < 1 | 1 | 2 |

I claim:

1. A composition stabilised against deterioration induced by the presence of transition metals which comprises a polymer selected from the group consisting of homopolymeric polyolefin, copolymeric polyolefin, copolymers derived from acrylonitrile, styrene and butadiene or acrylic esters and natural caoutchouc and from 0.01 to 5% by weight of said polymer of N,N'-bis-salicyloylhydrazine.

2. A composition according to claim 1 wherein said polymer is a homopolymeric of copolymeric polyolefin.

3. A composition according to claim 1, wherein said polymer is polypropylene.

4. A composition according to claim 1, wherein from 0.05 to 1.5% of N,N'-bis-salicyloyl-hydrazine is present.

5. A composition according to claim 4, wherein from 0.1 to 0.8% of N,N'-bis-salicyloyl-hydrazine is present.

6. The method of stabilising a polymer selected from group consisting of homopolymeric polyolefin, copolymeric polyolefin, copolymers derived from acrylonitrile, styrene and butadiene or acrylic esters and natural caoutchouc against deterioration induced by the presence of transition metals which comprises incorporating therein from 0.01 to 5% by weight of said polymer of N,N'-bis-salicyloyl-hydrazine.

7. The method according to claim 6, wherein said polymer is polypropylene and wherein from 0.1 to 0.8% of N,N'-bis-salicyloyl-hydrazine is present.

* * * * *